(12) United States Patent
Mukherjee et al.

(10) Patent No.: US 6,792,208 B1
(45) Date of Patent: Sep. 14, 2004

(54) METHOD AND APPARATUS FOR HIERARCHICAL OPTICAL SWITCHING

(75) Inventors: Biswanath Mukherjee, Davis, CA (US); Shun Yao, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 151 days.

(21) Appl. No.: 10/205,797

(22) Filed: Jul. 26, 2002

(51) Int. Cl.[7] .............................................. H04J 14/00
(52) U.S. Cl. ........................ 398/52; 398/45; 398/46; 398/47; 398/48; 398/50; 398/51; 398/55; 398/56; 398/79; 398/82; 398/83
(58) Field of Search ............................. 398/45, 46, 47, 398/48, 50, 51, 52, 56, 55, 79, 82, 83

(56) References Cited

U.S. PATENT DOCUMENTS

| | | | |
|---|---|---|---|
| 5,764,821 A | * 6/1998 | Glance | 385/14 |
| 6,449,073 B1 | * 9/2002 | Huber | 398/82 |
| 6,658,181 B2 | * 12/2003 | Wang et al. | 385/37 |
| 2002/0054407 A1 | 5/2002 | Yamada et al. | |
| 2002/0085251 A1 | 7/2002 | Ofek et al. | |

OTHER PUBLICATIONS

Publication entitled "Hierarchical Optical Path Cross–Connect Systems for Large Scale WDM Networks", by K. Harada et al., Optical Fiber Communications 99, ref [1].

Publication entitled "Design of Hierarchical Crossconnect WDM Networks Employing a Two–Stage Multiplexing Scheme of Waveband and Wavelenth", by Myungmoon Lee et al., IEEE Journal of Selected Areas in Communications, vol. 20, No. 1, Jan. 2002.

* cited by examiner

*Primary Examiner*—Hanh Phan
(74) *Attorney, Agent, or Firm*—Park, Vaughan & Fleming LLP

(57) ABSTRACT

One embodiment of the present invention provides a system that facilitates optical switching. The system starts by receiving a plurality of optical input signals. The system then divides each of the plurality of optical input signals into a plurality of wavebands that can be carried on a single optical fiber, wherein each waveband includes a predetermined subset of the wavelengths in the optical signal. Once the optical input signals have been divided into wavebands, the wavebands are then routed through a waveband switch. After being routed through the waveband switch, the wavebands are combined to form a plurality of optical output signals, where each optical output signal can possible include wavebands from different optical input signals. Additionally, some of the wavebands can be divided into wavelengths, and the wavelengths can be routed through a wavelength switch or a traffic grooming switch.

20 Claims, 6 Drawing Sheets

METHOD AND APPARATUS FOR HIERARCHICAL OPTICAL SWITCHING

BACKGROUND

1. Field of the Invention

The present invention relates to the design of optical networks. More specifically, the present invention relates to a method and apparatus that performs hierarchical optical switching to facilitate routing of data across an optical network.

2. Related Art

The explosive growth of the Internet has resulted in the vast demand for bandwidth by network operators. Experts predict that the Internet bandwidth demand will continue to grow rapidly by doubling itself every 6–9 months over the next several years. Such large bandwidth demand, coupled with the large bandwidth that optical fibers offer, is driving the wide deployment of optical networks. However, laying optical fibers in the ground is both expensive and time consuming. To meet the ever-growing bandwidth demand, the industry has been quick to embrace a technology that can multiply the transmission capacity of the existing fibers: wavelength-division multiplexing (WDM). With WDM technology, multiple wavelengths, each carrying a stream of bits at very high speed, can be transmitted simultaneously through a single fiber without interfering with one another.

In a short period of a few years, WDM technology has penetrated most of the optical networks, and will continue to be deployed in the future. New advances in the WDM technology has enabled more wavelengths to be available for telecom usage within the optical fiber's usable spectrum window. At the present time, the number of wavelengths in a typical telecom optical fiber ranges from 8 to 64, while more than one hundred wavelengths in one single fiber are becoming available in the near future.

As the total capacity of the network multiplies with WDM technology, one major challenge that exists for network operators is to effectively manage the increased amounts of bandwidth. Network operators need to deliver end-to-end connectivity at different data rates. The typical data rate on a wavelength is OC-48 (2.488 Gbps) or OC-192 (10 Gbps), with OC-768 (40 Gbps) becoming standard in the near future. However, connection requests from users come with different data rates. According to the widely-accepted Synchronous Optical Network (SONET) standard, connection are named as OC-N, where N indicates the data rate of the connection. Typical values are OC-1 (51.84 Mbps) (also referred to as STS-1), OC-3 (155.52 Mbps), OC-12 (622 Mbps), OC-48, OC-192, and OC-768. Lower-speed connections are grouped together to fill up the bandwidth of an entire wavelength (i.e., by using time-division multiplexing, TDM). Optical switches are used to inter-connect wavelengths and/or lower-speed connections at the network's switching nodes. These switching nodes perform two main functions: (1) routing connections from upstream nodes to downstream nodes, and (2) initiating and terminating connections to and from the client network elements (such as IP routers, ATM switches, etc.) which requested the connections.

The current art in switching technologies provides two approaches to the construction of an optical switch: an electronic switch fabric and an optical switch fabric. With an electronic switch fabric, the incoming optical signals are demultiplexed to separate out different wavelengths. Each wavelength is then terminated by a receiver that converts the bits from an optical signal to an electrical signal. These streams of bits then feed into an electronic switch fabric, which reads the bit streams from its input ports and routes them to its output ports. Once the streams exit from the electronic switch fabric, they are converted back to optical signals, on different wavelengths, and are multiplexed back together before entering the outgoing fiber. The electronic switch fabric is typically constructed from integrated circuit (IC) switch chips, which are smaller switches themselves (e.g., a 64×64 switch chip with 2.488 Gbps per port). Such a switching system is also called an optical-electrical-optical (OEO) switch, which means that all the optical signals are first converted to electrical signals, then switched electronically, and finally converted back to optical signals.

An alternative to electronic switch fabric is to use an optical switch fabric. An optical switch fabric can directly switch optical signals using, for example, tilting mirrors. Hence, it can switch a whole wavelength or a group of wavelengths without reading the bits. However, it cannot switch lower-speed connections within a wavelength.

What is needed is an optical switch that has large capacity and capability to switch different bandwidth granularities, both on the wavelength and sub-wavelength level. It also needs to have excellent scalability, i.e., the cost, power consumption, and size of the switch should be maintained at an acceptable level as the capacity of the switch grows larger.

SUMMARY

One embodiment of the present invention provides a system that facilitates optical switching. The system starts by receiving a plurality of optical input signals. The system then divides each of the plurality of optical input signals into a plurality of wavebands that can be carried on a single optical fiber, wherein each waveband includes a predetermined subset of the wavelengths in the optical signal. Once the optical input signals have been divided into wavebands, the wavebands are then routed through a waveband switch. After being routed through the waveband switch, the wavebands are combined to form a plurality of optical output signals, where each optical output signal can possibly include wavebands from different optical input signals. Additionally, some of the wavebands can be divided into wavelengths, and the wavelengths can be routed through a wavelength switch or a traffic grooming switch.

In a variation on this embodiment, the optical input signals are divided into wavebands by sending the optical input signals through an Arrayed Waveguide Grating (AWG) device.

In a variation on this embodiment, some of the plurality of wavebands are further divided into a plurality of wavelengths, and the wavelengths are routed through a wavelength switch. Note that some of the wavebands might be routed through the waveband switch, while others are divided into wavelengths and are routed through the wavelength switch.

In a further variation on this embodiment, the wavebands are divided into wavelengths by sending the wavebands through an AWG device.

In a further variation on-this embodiment, the plurality of wavelengths is further divided into a plurality of Time-Division Multiplexing (TDM) signals, and the TDM signals are routed through a switch. Note that some of the wavelengths might be routed through the wavelength switch, while others are divided into TDM signals.

In a variation on this embodiment, some of the plurality of wavebands are further divided into a plurality of wavelengths, and the wavelengths are routed through a TDM traffic grooming switch. Note that some of the wavebands might be routed through the waveband switch, while others are divided into wavelengths and are routed through the TDM traffic grooming switch.

In a variation on this embodiment, a subset of the optical input signals are routed directly to optical output signals without being divided into wavebands.

In a variation on this embodiment, routing of optical signals is performed by a Micro-Electro-Mechanical Systems (MEMS) based optical switch fabric.

In a variation on this embodiment, routing of optical signals is performed by a micro-fluid based optical switch fabric (bubble switch).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Circuit-Switched Network

Figure 1:
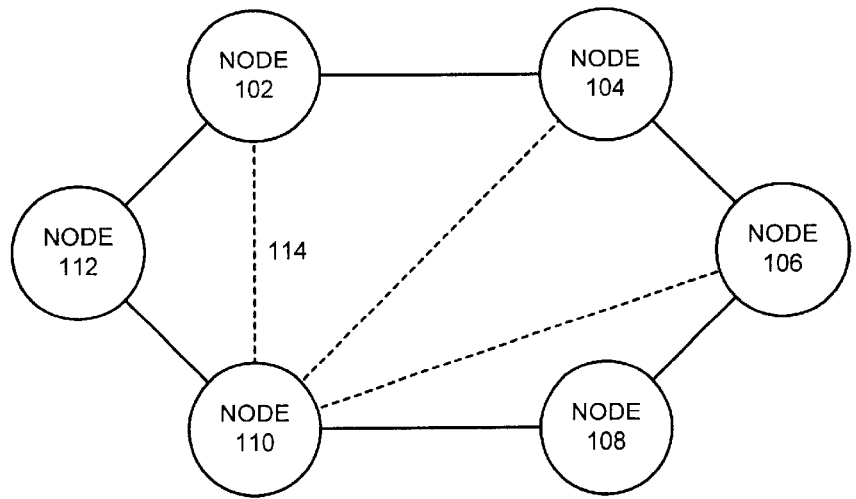
FIG. 1 illustrates a circuit-switched network in accordance with an embodiment of the present invention.

FIG. 1 illustrates circuit-switched network 100 in accordance with an embodiment of the present invention. Circuit-switched network 100 contains nodes 102 to 112. Optical switching allows for virtual connections to be made directly between all nodes in circuit-switched network 100. For example, in FIG. 1, direct connections are represented by solid lines and virtual connections are represented by dashed lines. Node 110 has a direct connection with nodes 108 and 112 via fiber. Similarly, node 112 has direct connection with node 102 via fiber. In contrast, node 110 has a virtual connection 114 with node 102 through an optical switch at node 112.

Optical Networking Background

For an electronic switch fabric, there are typically two types of switch chips available: grooming switches and non-grooming (crosspoint) switches. A grooming switch chip is capable of separating incoming bit streams into lower-speed streams (also called time slots) and switching these lower-speed streams. An example is a 64×64 switch chip, with 2.488 Gbps (OC-48) data rate on each input/output port. This chip can switch at a granularity of 51.84 Mbps (OC-1 or STS-1). In other words, although the input/output data rate at each port is 2.488 Gbps (OC-48), the chip can separate each 2.488 Gpbs stream into 48 51.84 Mbps streams and then switch them individually. This function is called "traffic grooming" or "time-slot interchange." The state-of-the-art grooming switch chip available today is a 72×72 OC-48 switch chip. In contrast, nongrooming chips do not have the capability of separating incoming bit streams into lower-speed streams. The state-of-the-art non-grooming chip is a 144×144 OC-48 switch chip.

For an optical switch fabric, there are currently two types of products. (There are other optical switch fabric technologies as well in various stages of development and maturity, but the two discussed below seem to be the leading contenders.) The first is micro-mechanical-electrical-system (MEMS)-based switch. This type of switch is based on micro-machined tilting mirrors fabricated on silicon or other semiconductor material. They are capable of re-directing incoming light beams to different output ports, regardless of how many wavelengths there are in the beam. Over a dozen vendors are trying to build commercial MEMS switches.

The second type of optical switch fabric is based on moving bubbles in liquid inside an optical waveguide. When a bubble is created and moved into the course of an optical waveguide, the light traveling in the waveguide can be re-directed through reflection. The bubble switch is also wavelength insensitive. This type of switch is mainly fabricated by Agilent Technologies, Inc. of Palo Alto, Calif., which applies its ink-jet technology to the switch design.

Both MEMS-based switches and bubble switches can switch one or multiple wavelengths at the same time, and they are bit-rate transparent; however, they cannot switch at sub-wavelength granularity (i.e., lower-speed connections). The state of the art is a 32×32 fabric, for both MEMS-based (by OMM Systems) and bubble switches (by Agilent).

There are several types of optical switch systems that vary according to the switch fabric used and how switch chips/fabrics are arranged. For OEO optical switch systems, there are grooming optical switches and non-grooming optical switches. An example of the grooming optical switch is the CoreDirector from Ciena Corporation of Linthicum, Md. It uses proprietary grooming chips to construct a 256×256 OC-48 switch, with OC-1 grooming granularity. An example of the non-grooming optical switch is the Aurora switch from Tellium, Inc. of Oceanport, N.J. Its capacity is 512×512 OC-48. The architecture of these OEO switches are typically Clos networks, where switch chips are arranged in a three-stage manner to achieve full non-blocking capability. Such architectures have poor scalability, as the number of switch chips required grows much faster than the overall switch size does. As a result, the cost, power consumption, and size of the entire switching system becomes unacceptable for large switch capacities. For switch systems based on optical switch fabrics, a main constraint is the small port count and high cost of the available optical switch fabric (MEMS-based or bubble-based). A large port-count switch system will require a large number of such optical switch fabrics, and the cost of such a system will be prohibitively high. An example of an optical-switch-fabric-based switching system is the 256×256 LambdaRouter from Agere Systems, Inc. of Allentwon, Pa.

Hierarchical Optical Switch

Figure 2:
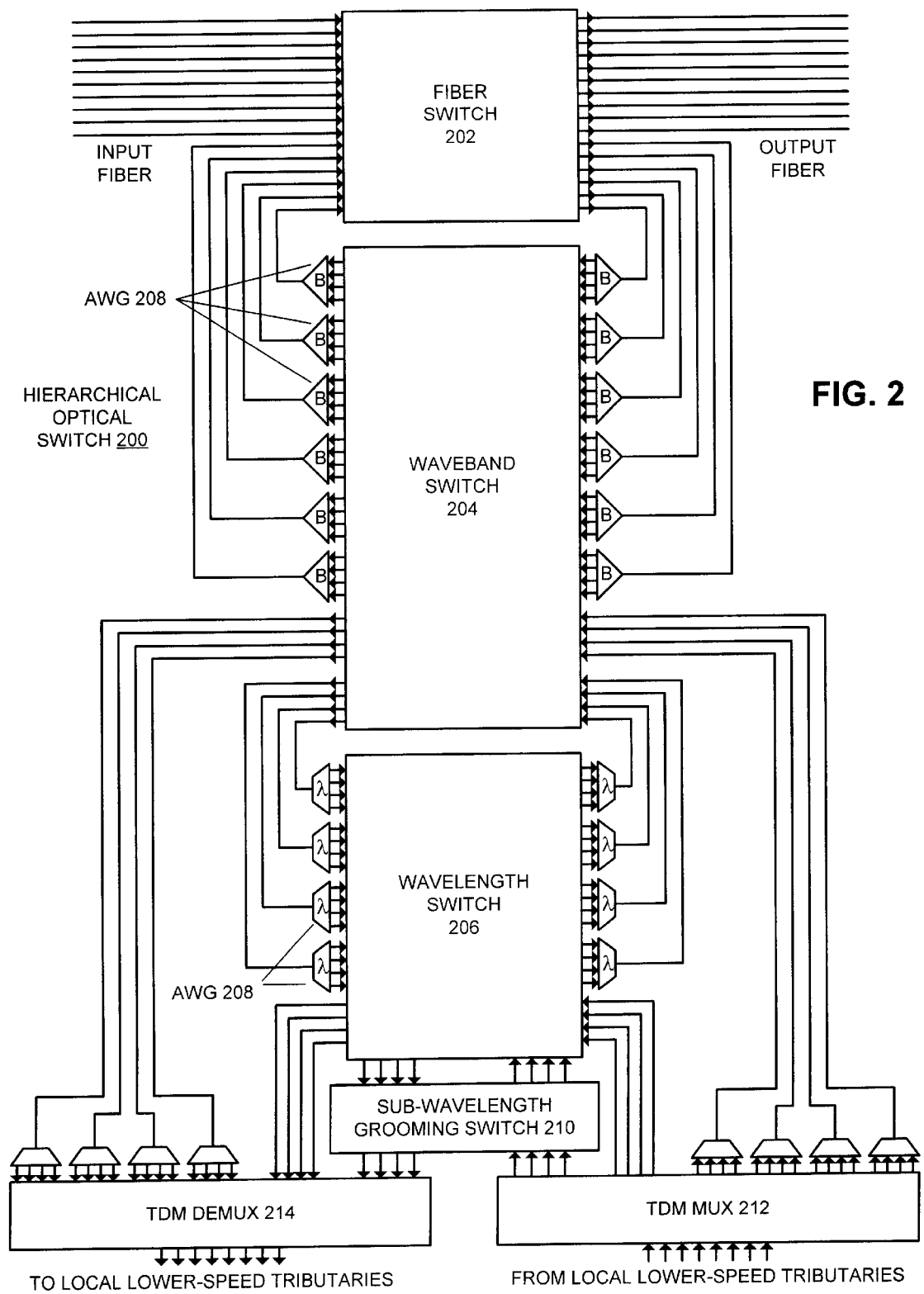
FIG. 2 illustrates a hierarchical optical switch in accordance with an embodiment of the present invention.

FIG. 2 illustrates a hierarchical optical switch 200 in accordance with an embodiment of the present invention.

Hierarchical optical switch 200 combines an optical switch fabric and an electronic switch fabric. As a result, it has large capacity, low cost, excellent flexibility, low power consumption, small size, and very good scalability. Hierarchical optical switch 200 includes the following parts (switch hierarchies): fiber switch 202, waveband (a collection of wavelengths) switch 204, wavelength switch 206, sub-wavelength grooming switch 210, TDM multiplexer 212, and TDM demultiplexer 214.

Note that the routing of optical signals in hierarchical optical switch 200 can be performed by any one of the following: a MEMS micro-mirror based switch; a microfluid based switch (bubble switch); a bulk mechanical switch; an electro-optic switch, wherein a material changes its refractive index when voltage or current is applied; a thermo-optic switch, wherein a material changes its physical dimension or refractive index when its temperature is changed; a broadcast-and-select switch, wherein the incoming signal is split and sent to multiple ON/OFF switches, and an ON/OFF switch selects which output port to allow the light to pass through; a grating-based switch, wherein gratings are used to select one or more wavelengths (the gratings can be fixed or reconfigurable); an acousto-optic switch, wherein an acoustic wave is used to construct a grating-like refractive index fluctuation in the waveguide material and select one or more wavelengths; or a polarization-based switch, wherein the incoming optical signal is polarized and passed through a polarization-sensitive device (e.g., liquid crystal material), which routes the light to different directions according to its polarization.

In fiber switch 202, incoming fibers are connected to an all-optical switch fabric. This switch fabric functions as an automatic patch panel that connects incoming fibers containing bypassing traffic directly to the outgoing fibers. Fibers containing traffic that needs to be switched at a finer granularity (e.g., waveband level, wavelength level, or sub-wavelength level) or that needs to be dropped at the local node are connected to output ports that lead to the next lower level in the hierarchy (i.e., waveband switch 204) of the switch system.

In waveband switch 204, incoming fibers, which come out from fiber switch 202, are first connected to Arrayed Waveguide Grating (AWG) device 208 which acts as a waveband demultiplexer. The function of a waveband demultiplexer is to separate all the wavelengths carried by a fiber into several groups (wavebands). These wavebands from different fibers are then sent into the optical switch fabric, which functions as a waveband switch. At the output of waveband switch 204, wavebands are multiplexed together and sent into fibers that lead to the next higher level of the switch hierarchy (i.e., fiber switch 202). In the optical switch fabric, wavebands can be switched into different fibers other than the ones they were originally traveling in.

Wavebands containing traffic that needs to be switched at wavelength-or sub-wavelength-level are sent to ports that lead to the next lower level of the switch hierarchy (i.e., wavelength switch 206) of the system. For wavebands containing only traffic to be dropped at the local node, they can be directly switched to the local TDM demultiplexer 214, which will demultiplex the wavebands into individual wavelengths and disseminate the connections to client network elements. Similarly, if there is enough traffic to initiate a whole waveband, the local TDM multiplexer 212 can aggregate all the traffic and directly send it in a waveband to waveband switch 204.

In wavelength switch 206, incoming wavebands are first sent to AWG device 208 which acts as a wavelength demultiplexer, which separates individual wavelengths from the waveband. These wavelengths are then sent into wavelength switch 206, which can be based on electronic switch chips or optical switch fabric. At the output of wavelength switch 206, wavelengths are multiplexed back into wavebands, and are sent to the next higher level of the switch hierarchy (i.e., waveband switch 204). In wavelength switch 206, wavelengths can be switched into different wavebands other than the ones they were originally traveling in. Wavelengths containing traffic that needs to be switched at sub-wavelength-level (i.e., traffic grooming/time-slot interchange) are sent to ports that lead to the next lower level of the switch hierarchy (i.e., sub-wavelength grooming switch 210) of the system. Wavelengths containing only traffic to be dropped at the local node can be directly switched to the local TDM demultiplexer 214, which terminates the wavelengths and disseminates the connections to client network elements. Similarly, if there is enough traffic to initiate a whole wavelength connection, the local TDM multiplexer 212 can aggregate all the traffic and directly send it in a wavelength to the wavelength switch.

In sub-wavelength grooming switch 210, incoming wavelengths are sent into a grooming switch, which is based on electronic grooming switch chips. At the output of sub-wavelength grooming switch 210, wavelengths are sent back to the next higher level of the switch hierarchy (i.e., wavelength switch 206). In sub-wavelength grooming switch 210, low-speed connections can be switched into different wavelengths other than the ones they were originally traveling in. For connections that need to be dropped at the local node, they can be switched to the local TDM demultiplexer 214, which will terminate the wavelengths and disseminate the connections to client network elements. Similarly, local traffic to be sent to the network is sent from the TDM multiplexer 212 to sub-wavelength grooming switch 210 and travels up the switch hierarchies (i.e., wavelength switch 206, waveband switch 204, and fiber switch 202) before it is sent out to the fibers leaving the node.

TDM multiplexer 212 and TDM demultiplexer 214 are responsible for aggregating/disseminating traffic from/to the local node.

Fiber switch 202 can be constructed with a MEMS-based optical switch fabric, in which tilting mirrors reflect all the light coming from one fiber into another fiber.

Figure 4:
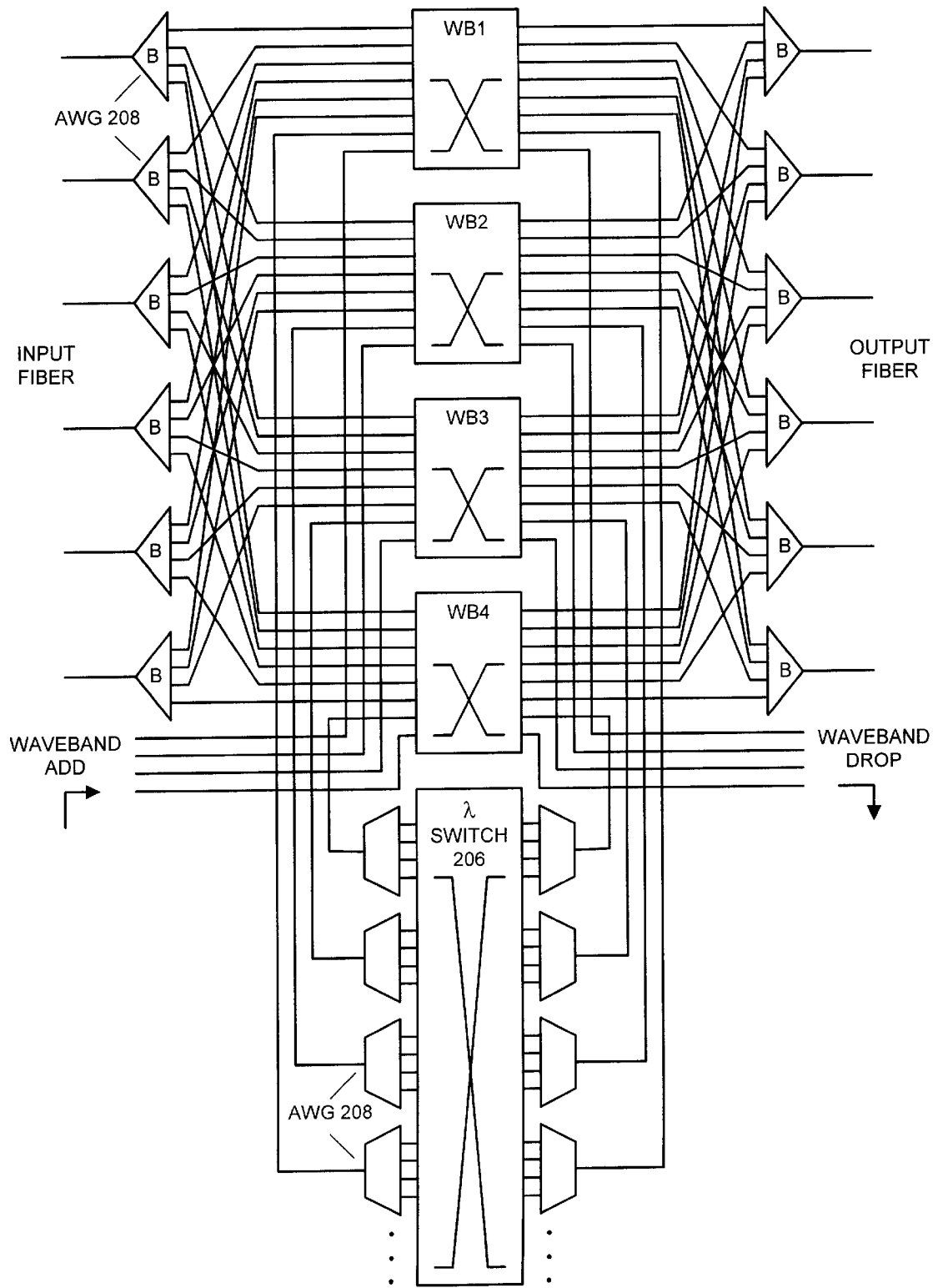
FIG. 4 illustrates a waveband and a wavelength switch in accordance with an embodiment of the present invention.

Waveband switch 204 can be constructed with a MEMS-based optical switch fabric. One embodiment of waveband switch 204 is shown in FIG. 4. Each MEMS switch fabric is responsible for switching among the same wavebands from different fibers. In other words, there is one MEMS switch fabric used for each waveband layer. This arrangement also contributes to the excellent scalability of the system. As the number of wavelengths increases, the number of the wavebands remains the same, and the size of waveband switch 204 remains the same as well.

Wavelength switch 206 can be constructed with available electronic cross-point switch chips (e.g., a 144×144 OC-48 crosspoint switch chip). One embodiment of the wavelength switch architecture is the fully non-blocking Clos network configuration. Alternatively, wavelength switch 206 can be constructed in a wavelength-layered fashion (also called wavelength-dilated switch), similar to waveband switch 204.

Sub-wavelength grooming switch 210 can be constructed with available electronic grooming switch chips (e.g., a 72×72 OC-48 grooming switch chip). One embodiment of sub-wavelength grooming switch 210 is the fully non-blocking Clos network configuration. Alternatively, subwavelength grooming switch 210 can be constructed in a wavelength-layered (wavelength-dilated) fashion.

TDM multiplexer 212 and TDM demultiplexer 214 can be one of the current traffic aggregation products in the market. An example is the multi-service provisioning platform (MSPP).

Arrayed Waveguide Grating Device

Figure 3:
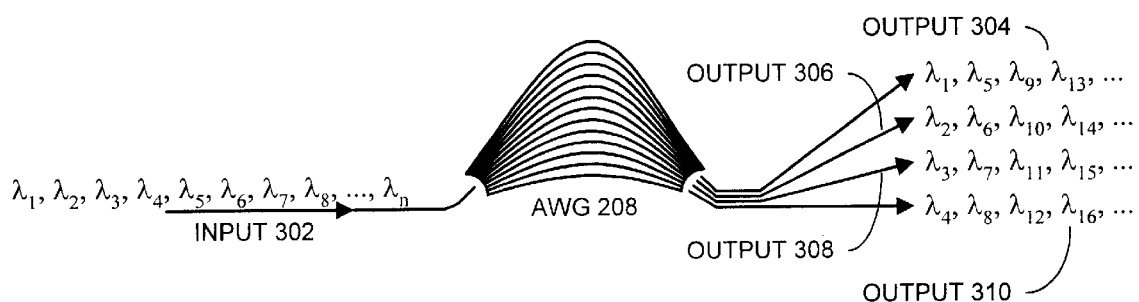
FIG. 3 illustrates an Arrayed Waveguide Grating (AWG) device in accordance with an embodiment of the present invention.

FIG. 3 illustrates an Arrayed Waveguide Grating (AWG) device in accordance with an embodiment of the present invention. AWG 208 can take multiple wavelengths from input 302, and transmit all the wavelengths to output ports 304 to 310 in a cyclic fashion. As a result, AWG 208 can function as a waveband demultiplexer that separates all the wavelengths from one fiber into several wavelength groups. Because AWGs are reciprocal devices, they can also function as waveband multiplexers. One main advantage of using AWG 208 is its scalability. As the number of wavelengths increases in the fiber, the same AWG can be used to group wavelengths. Other significant advantages of AWG 208 are: mature technology, passive device, and ready commercial availability from numerous vendors.

In another embodiment of the present invention, instead of using AWG 208, the waveband multiplexer/demultiplexer can be constructed with other means such as coarse WDM multiplexer/demultiplexer. The latter functions similarly to wavelength multiplexer/demultiplexer, except that the coarse WDM multiplexer/demultiplexer has a much wider passband at each output. Therefore, it can separate all the wavelengths into groups or merge wavelength groups together.

In another embodiment of the present invention, the waveband demultiplexer can be replaced by a device that selects (or can be programmed to select) a number of arbitrary wavelengths from the incoming fiber and send them individually to wavelength switch 206 or local TDM demultiplexer 214. Similarly, these devices can accept a number of arbitrary wavelengths from wavelength switch 206 or local TDM demultiplexer 214 and multiplex them back to the outgoing fiber.

For waveband switch 204, an alternative embodiment of the present invention is to use a bubble switch or any other optical switch technology that is wavelength insensitive instead of MEMS-based switch.

Another embodiment of the present invention is to bypass wavelength switch 206, and connect waveband switch 204 directly to sub-wavelength grooming switch 210.

Another embodiment of the present invention is to bypass subwavelength grooming switch 210.

Waveband and Wavelength Switches

FIG. 4 illustrates a waveband and a wavelength switch in accordance with an embodiment of the present invention. In this embodiment of the present invention, AWG 208 functions as both a waveband multiplexer/demultiplexer and a wavelength multiplexer/demultiplexer.

Hierarchical Optical Switch with TDM Traffic Grooming Switch

Figure 5:
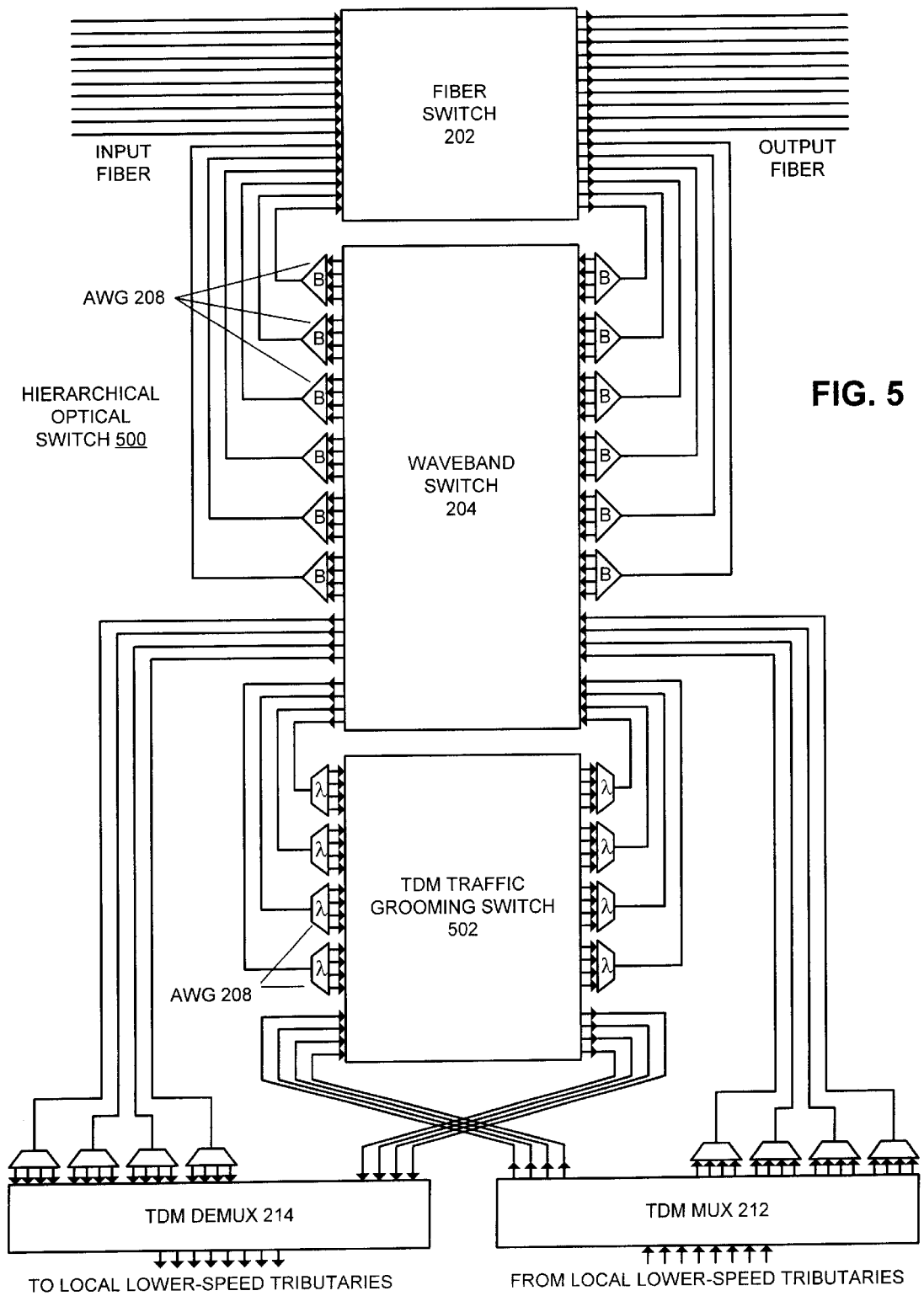
FIG. 5 illustrates a hierarchical optical switch with a TDM traffic grooming switch in accordance with an embodiment of the present invention.

FIG. 5 illustrates hierarchical optical switch 500 with TDM traffic grooming switch 502 in accordance with an embodiment of the present invention. In this embodiment, hierarchical optical switch 500 is similar to hierarchical optical switch 200 from FIG. 2, but has one major difference. Instead of having wavelength switch 206 and sub-wavelength switch 210, as in hierarchical optical switch 200, hierarchical optical switch 500 has TDM Traffic Grooming Switch 502 which combines the functions of wavelength switch 206 and sub-wavelength switch 210.

Hierarchical Optical Switch without Sub-Wavelength Grooming

Figure 6:
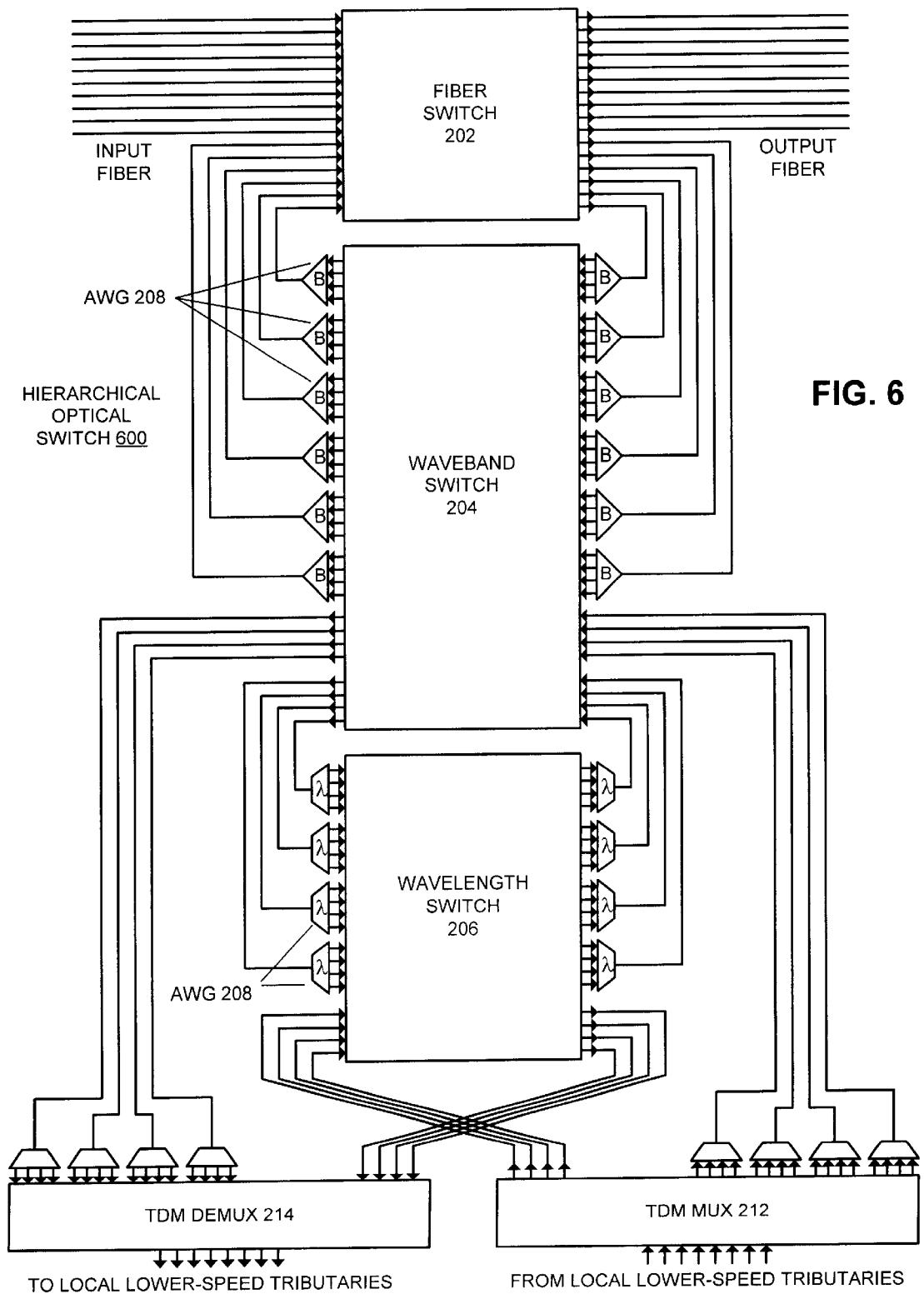
FIG. 6 illustrates a hierarchical optical switch without sub-wavelength grooming in accordance with an embodiment of the present invention.

FIG. 6 illustrates hierarchical optical switch 600 without subwavelength grooming switch 210 in accordance with an embodiment of the present invention. In this embodiment, hierarchical optical switch 600 is similar to hierarchical optical switch 200 from FIG. 2, but has one major difference. Hierarchical optical switch 600 does not contain sub-wavelength grooming switch 210. Instead, wavelength switch 206 is connected directly to TDM multiplexer 212 and TDM demultiplexer 214.

Process of Hierarchical Switching

Figure 7:
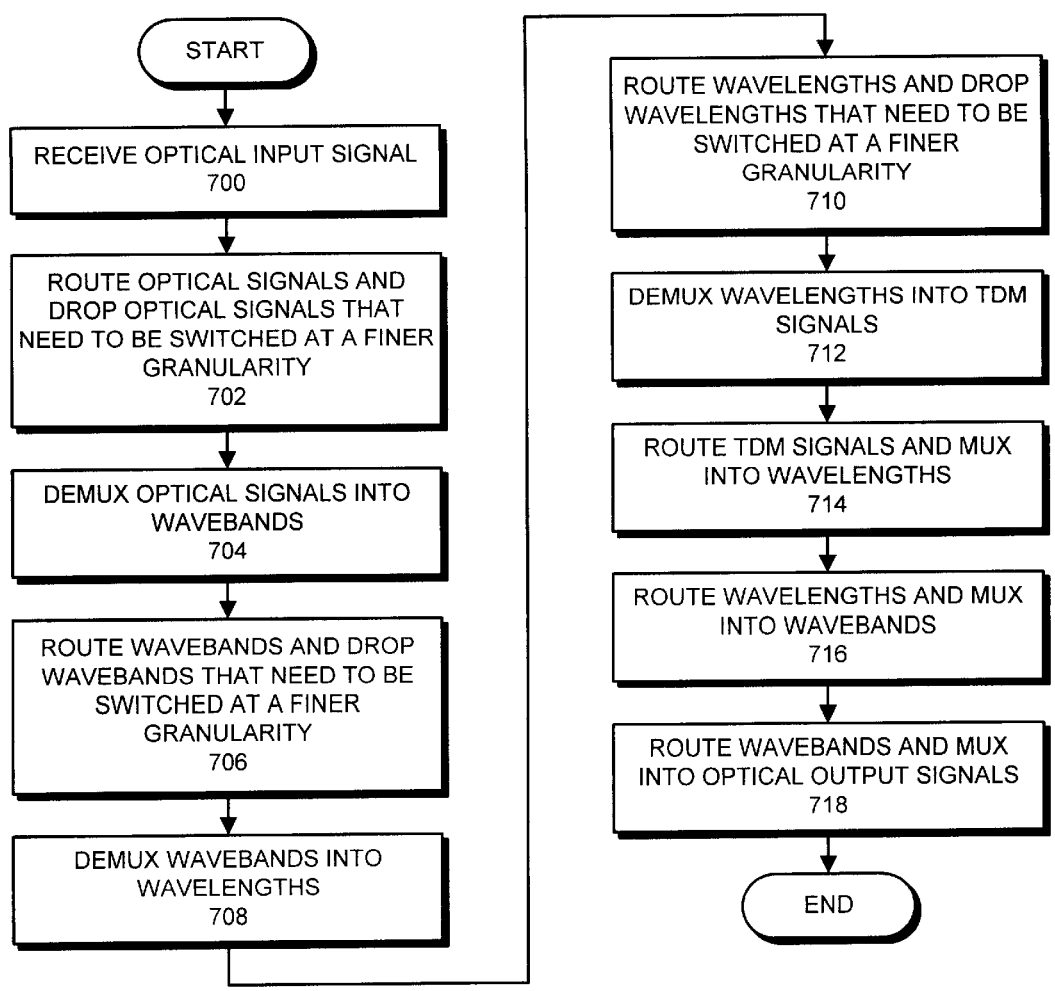
FIG. 7 illustrates the process of hierarchical switching in accordance with an embodiment of the present invention.

FIG. 7 illustrates the process of hierarchical switching in accordance with an embodiment of the present invention. The system starts by receiving an optical input signal (step 700). Next, the system routes the optical signals and drops optical signals that need to be switched at a finer granularity (step 702). The system then demultiplexes the optical signals into wavebands (step 704), routes the wavebands, and drops wavebands that need to be switched at a finer granularity (step 706). Next, the system demultiplexes the dropped wavebands into wavelengths (step 708), routes the wavelengths, and drops wavelengths that need to be switched at a finer granularity (step 710). Dropped wavelengths are then demultiplexed into TDM signals (step 712), and the TDM signals are routed and multiplexed into wavelengths (step 714). Then the wavelengths are routed and multiplexed into wavebands (step 716). Finally, wavebands are routed and multiplexed into optical output signals (step 718).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for switching signals between optical fibers, comprising:

receiving a plurality of optical input signals;

dividing each of the plurality of optical input signals into a plurality of wavebands that can be carried on a single optical fiber, wherein each waveband includes a predetermined subset of the wavelengths in the optical signal;

routing the plurality of wavebands through a waveband switch;

forming a plurality of optical output signals from outputs of the waveband switch, wherein a given optical output signal is formed by combining a plurality of wavebands;

dividing a number of the wavebands into a plurality of Time-Division Multiplexing (TDM) time slots; and routine the plurality of TDM time slots to different destinations through a TDM grooming switch, wherein the TDM grooming switch may add one or more TDM time slots to an arbitrary wavelength channel;

drop one or more TDM time slots from an arbitrary wavelength channel; and interchange one or more TDM time slots among an arbitrary number of wavelength channels.

2. The method of claim 1, wherein dividing each of the plurality of optical input signals into a plurality of wavebands involves using an Arrayed Waveguide Grating (AWG) device.

3. The method of claim 1, further comprising:
dividing a number of wavebands into a plurality of wavelengths; and
routing the plurality of wavelengths through a wavelength switch.

4. The method of claim 3, wherein dividing the number of wavebands into a plurality of wavelengths involves using an AWG device.

5. The method of claim 1, further comprising routing a subset of the plurality of optical input signals without dividing the subset of optical input signals into the plurality of wavebands.

6. The method of claim 1, wherein the routing of optical signals is performed by a Micro-Electro-Mechanical Systems (MEMS) based optical switch fabric.

7. The method of claim 1, wherein the routing of optical signals is performed by a micro-fluid based optical switch fabric (bubble switch).

8. An apparatus for switching signals between optical fibers, comprising:
a receiving mechanism configured to receive a plurality of optical input signals;
a dividing mechanism configured to divide each of the plurality of optical input signals into a plurality of wavebands that can be carried on a single optical fiber, wherein each waveband includes a predetermined subset of the wavelengths in the optical signal;
a routing mechanism configured to route the plurality of wavebands through a waveband switch;
a combining mechanism configured to form a plurality of optical output signals from outputs of the waveband switch, wherein a given optical output signal is formed by combining a plurality of wavebands;
a timing mechanism configured to divide a number of the wavebands into a plorality of TDM time slots; and
a TDM grooming switch configured to route the plurality of TDM time slots to different destinations, wherein the TDM grooming switch may
add one or more TDM time slots to an arbitrary wavelength channel;
drop one or more TDM time slots from an arbitrary wavelength channel; and
interchange one or more TDM time slots among an arbitrary number of wavelength channels.

9. The apparatus of claim 8, wherein the dividing mechanism includes an Arrayed Waveguide Grating (AWG) device.

10. The apparatus of claim 8, further comprising:
a secondary dividing mechanism configured to divide a number of wavebands into a plurality of wavelengths; and
a secondary routing mechanism configured to route the plurality of wavelengths through a wavelength switch.

11. The apparatus of claim 10, wherein the secondary dividing mechanism includes an AWG device.

12. The apparatus of claim 8, further comprising a primary switching mechanism configured to route a subset of the plurality of optical input signals without dividing the subset of optical input signals into the plurality of wavebands.

13. The apparatus of claim 8, wherein the routing mechanism is configured to route the optical signals with a Micro-Electro-Mechanical Systems (MEMS) based optical switch fabric.

14. The apparatus of claim 8, wherein the routing mechanism is configured to route the optical signals with a micro-fluid based optical switch fabric (bubble switch).

15. An optical network, comprising a plurality of optical cross-connects that are coupled together to form the optical network, wherein each optical cross-connect includes:
a plurality of optical signal inputs;
a plurality of waveband demultiplexers, wherein a waveband is a predetermined subset of the wavelengths in an optical signal, wherein each of the plurality of optical signal inputs is coupled to one of the plurality of waveband demultiplexers, so that the waveband demultiplexer converts the optical signal from the optical signal input into a plurality of wavebands;
a waveband switch;
a plurality of waveband multiplexers;
a plurality of optical signal outputs, wherein each of the plurality of optical signal outputs is coupled to one of the plurality of waveband multiplexers, so that the waveband multiplexer converts a subset of the plurality of wavebands into an optical signal for the optical signal output
a plurality of TDM demultiplexers;
a plurality of TDM multiplexers; and
a TDM grooming switch, wherein the TDM grooming switch may
add one or more TDM time slots to an arbitrary wavelength channel; and
drop one or more TDM time slots from an arbitrary wavelength channel; and
interchange one or more TDM time slots among an arbitrary number of wavelength channels.

16. The optical network of claim 15, wherein each of the plurality of waveband demultiplexers includes Arrayed Waveguide Grating (AWG) devices.

17. The optical network of claim 15, further comprising:
a plurality of wavelength demultiplexers;
a wavelength switch; and
a plurality of wavelength multiplexers.

18. The optical network of claim 17, wherein the plurality of wavelength demultiplexers is comprised of AWG devices.

19. The optical network of claim 15, wherein the waveband switch is comprised of a Micro-Electro-Mechanical Systems (MEMS) based optical switch fabric.

20. The optical network of claim 15, wherein the waveband switch is comprised of a micro-fluid based optical switch fabric (bubble switch).

* * * * *

UNITED STATES PATENT AND TRADEMARK OFFICE
CERTIFICATE OF CORRECTION

PATENT NO. : 6,792,208 B1
DATED : September 14, 2004
INVENTOR(S) : Biswanath Mukherjee and Shun Yao It is certified that error appears in the above-identified patent and that said Letters Patent is hereby corrected as shown below:

Column 8,
Line 55, please delete the word "routine" and replace with the word -- routing --.

Signed and Sealed this

Ninth Day of November, 2004

JON W. DUDAS
*Director of the United States Patent and Trademark Office*